United States Patent
Chiang et al.

(10) Patent No.: US 7,337,021 B2
(45) Date of Patent: Feb. 26, 2008

(54) ROBUST SPACECRAFT CONTROLLER AND METHOD FOR DESIGNING SAME

(75) Inventors: Richard Y. Chiang, Rancho Palos Verdes, CA (US); Che-Hang Charles Ih, Rancho Palos Verdes, CA (US); Yeong-Wei Andy Wu, Rancho Palos Verdes, CA (US)

(73) Assignee: The Boeing Company, Chicago, IL (US)

( * ) Notice: Subject to any disclaimer, the term of this patent is extended or adjusted under 35 U.S.C. 154(b) by 969 days.

(21) Appl. No.: 10/397,495

(22) Filed: Mar. 26, 2003

(65) Prior Publication Data

US 2004/0193292 A1 Sep. 30, 2004

(51) Int. Cl.
*G05B 13/02* (2006.01)

(52) U.S. Cl. .............................. 700/28; 700/29; 700/30; 700/31

(58) Field of Classification Search ............. 700/28–31
See application file for complete search history.

(56) References Cited

U.S. PATENT DOCUMENTS

| | | | | |
|---|---|---|---|---|
| 4,679,136 A * | 7/1987 | Shigemasa | ................... | 700/30 |
| 5,489,829 A * | 2/1996 | Umida | ........................ | 318/561 |
| 5,877,954 A * | 3/1999 | Klimasauskas et al. | ....... | 700/29 |
| 6,064,997 A * | 5/2000 | Jagannathan et al. | ......... | 706/23 |
| 6,470,225 B1 * | 10/2002 | Yutkowitz | .................... | 700/44 |
| 6,961,628 B2 * | 11/2005 | Yutkowitz | .................... | 700/37 |
| 2005/0137724 A1 * | 6/2005 | Hovakimyan et al. | ........ | 700/48 |
| 2005/0182499 A1 * | 8/2005 | Calise et al. | .................. | 700/28 |

* cited by examiner

*Primary Examiner*—Ronald D Hartman, Jr.
(74) *Attorney, Agent, or Firm*—Gates & Cooper LLP (57) ABSTRACT

A method, apparatus, article of manufacture, and a memory structure for designing a robust controller. The method comprises the steps of determining a plant model G of the system dynamics; bounding system dynamics unmodeled by the plant model G of the system dynamics by a weighting function W; applying a transform to an augmented plant model T having the plant model G and the weighting function W; defining a controller $\bar{F}$ from the transformed plant model T; and applying an inverse of the transform to the controller $\bar{F}$ defined from the transformed plant model and the weighting function W to generate the robust controller F.

36 Claims, 8 Drawing Sheets

ROBUST SPACECRAFT CONTROLLER AND METHOD FOR DESIGNING SAME

BACKGROUND OF THE INVENTION

1. Field of the Invention

The present invention relates to systems and methods for designing and operating feedback control systems, and in particular to a system and method for robustly controlling spacecraft.

2. Description of the Related Art

Controllers are often employed to stabilize or improve the stability of an inherently unstable or marginally stable dynamic system. Such controllers are typically designed using well known state-space or Laplace transform techniques.

However, most dynamic systems include one or more non-linearities (e.g. actuator saturation, sensor dynamic range, plant operation envelope) that make the derivation of closed form controller solutions difficult or impossible.

In most cases, the system non-linearities do not substantially affect controller design or system performance in measures of interest, and can simply be ignored. However, in many cases, system non-linearities have a substantial effect on system performance. In such cases, the system non-linearities must be accounted for in the controller design.

One solution to this problem is to generate a linearized model of the system (including the system non-linearities), and design the controller using linear control system design techniques. However, while appropriate for some non-linearities, this technique is not generally applicable to all non-linearities.

Another solution is to generate a detailed simulation (e.g. an N degree of freedom, or N DOF simulation) of the system, including the non-linear elements, and use that simulation to design a controller to meet system requirements. This solution, however, can be time and resource intensive, both in generating the simulation and in performing multiple monte-carlo simulations to account for stochastically-modeled processes. Detailed simulations can also be very sensitive to modeling errors and uncertainties. Further, even when a detailed N DOF simulation is available, it can be difficult to design a controller without a starting point that is reasonably close to a stable solution that meets system requirements.

These difficulties are particularly apparent when considering the design of a controller for the attitude control system (ACS) of a spinning spacecraft during a transfer orbit mission. During the transfer orbit mission, the spacecraft can be difficult to control due to a strong interaction between the dynamics of fuel sloshing around in the fuel vessels (fuel slosh) and the dynamics of the spinning spacecraft. Fuel slosh dynamics are not only difficult and complicated to model, they are also highly uncertain.

Existing spacecraft ACS transfer orbit controller designs include Wheel Gyro Wobble and Nutation Control (WGWANC) systems. Unfortunately, this design is not robust to fuel slosh dynamics and system uncertainties. This is due to the nature of the WGWANC design methodology, which attempts to decouple 3-axis dynamics by absorbing the inverse of the plant inertial into the controller. This seriously degrades ACS controller robustness when the actual plant dynamics differ from model predictions.

WGWANC design procedures are also typically based on a classical $2^{nd}$ order approximation of the plant dynamics. The controllers that result require substantial tuning (in the form of gain-scheduling, for example) throughout the mission to assure stability and adequate performance. Such gain scheduling can result in complicated software and mission operation procedures.

What is needed is a simple, effective method for designing system controllers that are robust to system uncertainties and non-linearities, for example, an ACS controller for spinning spacecraft that is robust to fuel sloshing effects.

The present invention satisfies that need.

SUMMARY OF THE INVENTION

To address the requirements described above, the present invention discloses a method, apparatus, and article of manufacture for designing a robust controller. The method comprises the steps of determining a plant model G of the system dynamics; bounding system dynamics unmodeled by the plant model G of the system dynamics by a weighting function W; applying a transform to an augmented plant model T having the plant model G and the weighting function W; defining a controller $\tilde{F}$ from the transformed plant model T; and applying an inverse of the transform to the controller $\tilde{F}$ defined from the transformed plant model and the weighting function W to generate the robust controller F. The apparatus comprises means, such as a digital computer having a processor and a memory, for performing the foregoing operations. The article of manufacture comprises a program storage device tangibly embodying instructions for performing the foregoing method steps.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
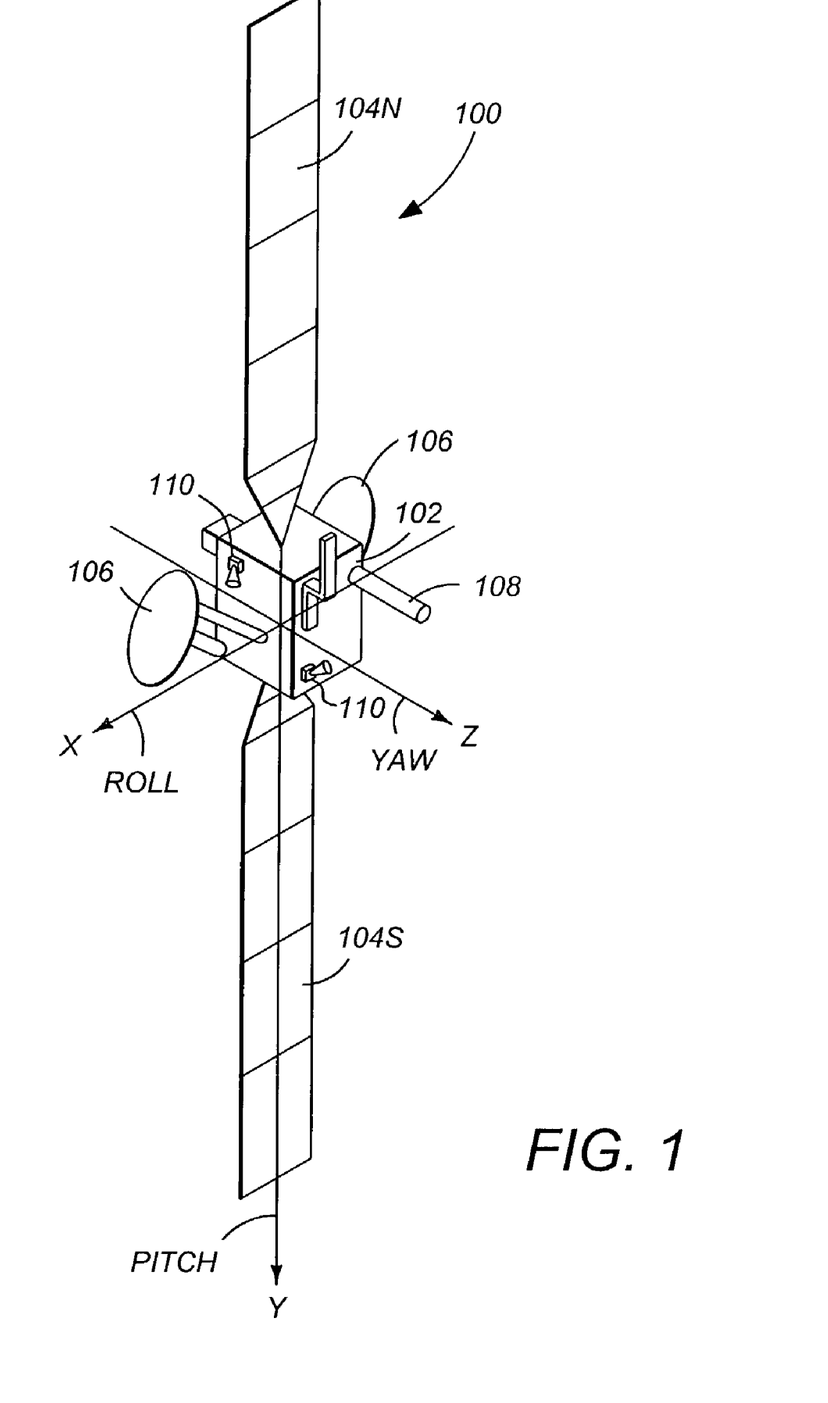
FIG. 1 is an illustration of a spacecraft.

FIG. 1 illustrates a three-axis stabilized satellite or spacecraft 100. The satellite 100 has a main body or spacecraft bus 102, a pair of solar panels 104, a pair of high gain narrow beam antennas 106, and a telemetry and command omnidirectional antenna 108 which is aimed at a control ground station. The satellite 100 may also include one or more sensors 110 to measure the attitude of the satellite 100. These sensors may include sun sensors, earth sensors, and star sensors. Since the solar panels are often referred to by the designations "North" and "South", the solar panels in FIG. 1 are referred to by the numerals 104N and 104S for the "North" and "South" solar panels, respectively.

The three axes of the spacecraft 100 are shown in FIG. 1. The pitch axis P lies along the plane of the solar panels 140N and 140S. The roll axis R and yaw axis Y are perpendicular to the pitch axis P and lie in the directions and planes shown. The antenna 108 points to the Earth along the yaw axis Y.

Figure 2:
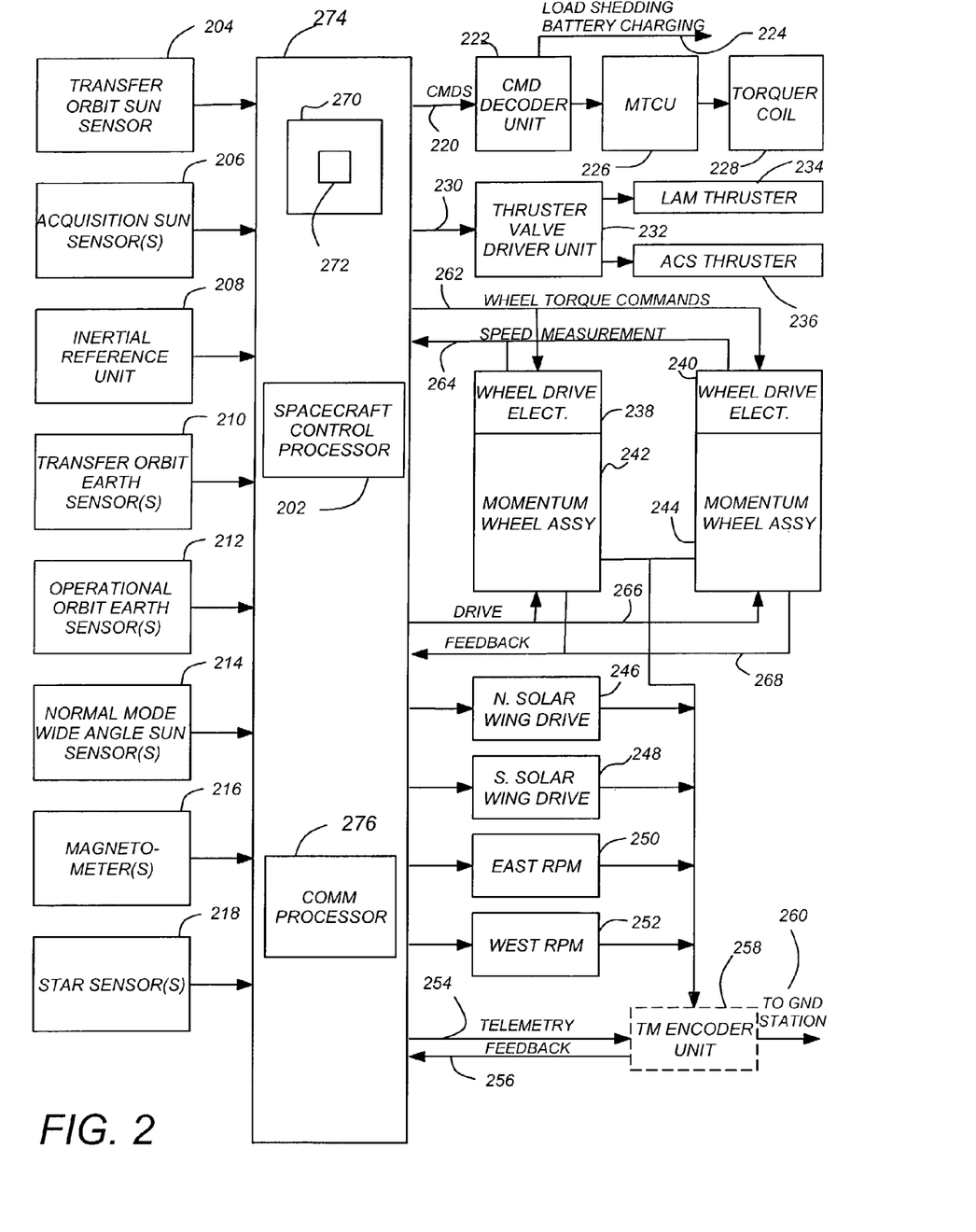
FIG. 2 is a diagram depicting the functional architecture of a representative spacecraft attitude and control system.

FIG. 2 is a diagram depicting the functional architecture of a representative attitude control system (ACS). The spacecraft 100 includes a processor subsystem 274, which may include a spacecraft control processor (SCP) 202 and a communication processor (CP) 276.

The SCP 202 implements control of the spacecraft 100. The SCP 202 performs a number of functions which may include post ejection sequencing, transfer orbit processing, acquisition control, stationkeeping control, normal mode control, mechanisms control, fault protection, and spacecraft systems support, among others. The post ejection sequencing could include initializing to assent mode and thruster active nutation control (TANC). The transfer orbit processing could include attitude data processing, thruster pulse firing, perigee assist maneuvers, and liquid apogee motor (LAM) thruster firing. During LAM thruster firing, the satellite is typically spin-stabilized, rather than 3-axis stabilized.

The acquisition control could include idle mode sequencing, sun search/acquisition, and Earth search/acquisition. The stationkeeping control could include auto mode sequencing, gyro calibration, stationkeeping attitude control and transition to normal. The normal mode control could include attitude estimation, attitude and solar array steering, momentum bias control, magnetic torquing, and thruster momentum dumping (H-dumping). The mechanisms mode control could include solar panel control and reflector positioning control. The spacecraft control systems support could include tracking and command processing, battery charge management and pressure transducer processing.

Input to the spacecraft control processor 202 may come from a any combination of a number of spacecraft components and subsystems, such as a transfer orbit sun sensor 204, an acquisition sun sensor 206, an inertial reference unit 208, a transfer orbit Earth sensor 210, an operational orbit Earth sensor 212, a normal mode wide angle sun sensor 214, a magnetometer 216, and one or more star sensors 218.

The SCP 202 generates control signal commands 220 which are directed to a command decoder unit 222. The command decoder unit operates the load shedding and battery charging systems 224. The command decoder unit also sends signals to the magnetic torque control unit (MTCU) 226 and the torque coil 228.

The SCP 202 also sends control commands 230 to the thruster valve driver unit 232 which in turn controls the liquid apogee motor (LAM) thrusters 234 and the attitude control thrusters 236.

Wheel torque commands 262 are generated by the SCP 202 and are communicated to the wheel speed electronics 238 and 240. These effect changes in the wheel speeds for wheels in momentum wheel assemblies 242 and 244, respectively. The speed of the wheels is also measured and fed back to the SCP 202 by feedback control signal 264.

The spacecraft control processor also sends jackscrew drive signals 266 to the momentum wheel assemblies 243 and 244. These signals control the operation of the jackscrews individually and thus the amount of tilt of the momentum wheels. The position of the jackscrews is then fed back through command signal 268 to the spacecraft control processor. The signals 268 are also sent to the telemetry encoder unit 258 and in turn to the ground station 260.

The spacecraft control processor also sends command signals 254 to the telemetry encoder unit 258 which in turn sends feedback signals 256 to the SCP 202. This feedback loop, as with the other feedback loops to the SCP 202 described earlier, assist in the overall control of the spacecraft. The SCP 202 communicates with the telemetry encoder unit 258, which receives the signals from various spacecraft components and subsystems indicating current operating conditions, and then relays them to the ground station 260.

The wheel drive electronics 238, 240 receive signals from the SCP 202 and control the rotational speed of the momentum wheels. The jackscrew drive signals 266 adjust the orientation of the angular momentum vector of the momentum wheels. This accommodates varying degrees of attitude steering agility and accommodates movement of the spacecraft as required.

The CP 276 and SCP 202 may include or have access to one or more memories 270, including, for example, a random access memory (RAM). Generally, the CP and SCP 202 operates under control of an operating system 272 stored in the memory 270, and interfaces with the other system components to accept inputs and generate outputs, including commands. Applications running in the CP 276 and SCP 202 access and manipulate data stored in the memory 270. The spacecraft 100 may also comprise an external communication device such as a satellite link for communicating with other computers at, for example, a ground station. If necessary, operation instructions for new applications can be uploaded from ground stations. The CP 276 and SCP 202 can also be implemented in a single processor, or with different processors having separate memories.

In one embodiment, instructions implementing the operating system 272, application programs, and other modules are tangibly embodied in a computer-readable medium, e.g., data storage device, which could include a RAM, EEPROM, or other memory device. Further, the operating system 272 and the computer program are comprised of instructions which, when read and executed by the SCP 202, causes the spacecraft processor 202 to perform the steps necessary to implement and/or use the present invention. Computer program and/or operating instructions may also be tangibly embodied in memory 270 and/or data communications devices (e.g. other devices in the spacecraft 10 or on the ground), thereby making a computer program product or article of manufacture according to the invention. As such, the terms "program storage device," "article of manufacture" and "computer program product" as used herein are intended to encompass a computer program accessible from any computer readable device or media.

Figure 3:
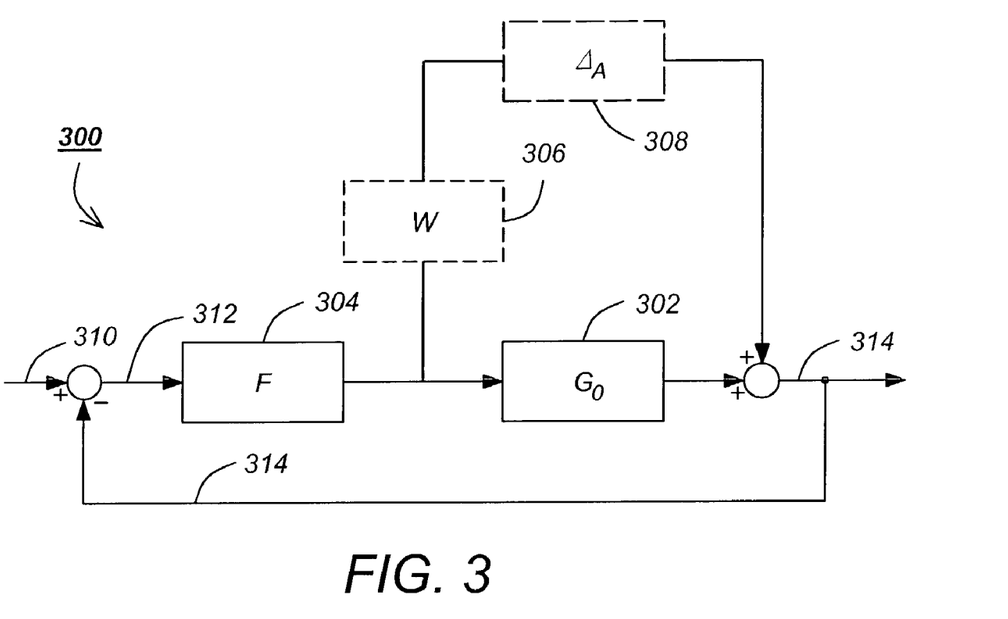
FIG. 3 is a block diagram presenting a representation of a control system model.

FIG. 3 is a block diagram presenting representation of a control system model 300. The model 300 includes a representation of a command input 310, which is compared to the output 314 to generate an error 312.

The control system model 300 includes a plant model G 302. In the illustrative example presented herein, the control system model 300 is a satellite control system and plant model G 302 is a representation of satellite rigid body dynamics. The plant model G 302 typically includes only linear or linearized representations of the plant. The satellite control system model 300 also includes a controller F 304. The controller F 302 is designed to modify the error signal 314 as required to achieve the desired overall system response before providing the signal the rigid body dynamics G 302.

The system model 300 also includes an model for dynamics that are unmodeled by the plant model G 302. In one embodiment, these unmodeled dynamics include fuel slosh dynamics $\Delta_A$ 308, which will be described further herein. The system model 300 also includes a bounding or weighting function W 306, which bounds the unmodeled dynamics 308 as described further below.

Figure 4:
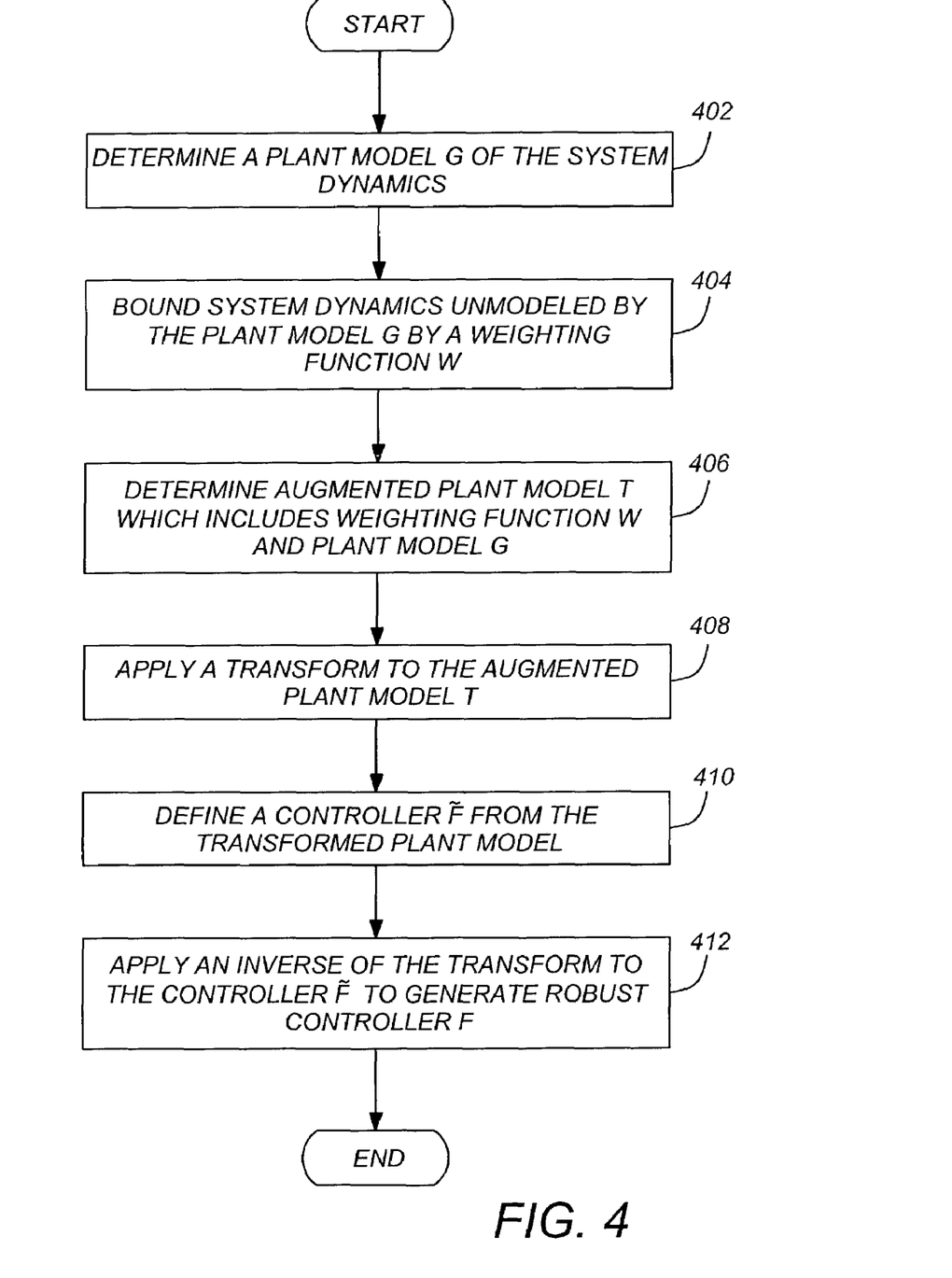
FIG. 4 is a flow chart presenting illustrative steps that can be used to design a robust controller for a dynamic system.

FIG. 4 is a flow chart presenting illustrative steps that can be used to design a robust controller for a dynamic system such as that which is presented in system model 300. In block 402, a plant model G 302 of the system dynamics is determined. Typically, the plant model G 302 is a linearized plant model, such as the model of the linearized rigid body dynamics as shown below.

Linearized Rigid Body Dynamics

Figure 5:
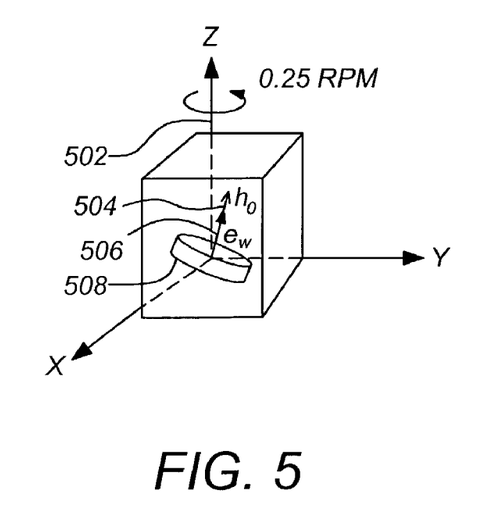
FIG. 5 is a diagram of a linearized model of a spinning body.

FIG. 5 is a diagram of a linearized model of a spinning body such as the satellite 100, when undergoing orbital transfer maneuvers. This example is used in the following discussion to provide an example of how the present invention can be used to design a robust control system.

In the illustrated example, the satellite 100 body is a rigid body with a mass, spinning about an axis such as the z-axis as shown. The linearized dynamic model G 302 about a nominal spacecraft spin rate $\Omega_0$ and constant wheel 508 momentum $h_0$ 504 along unit vector axis $e_w$ 506 in the satellite 100 body frame (typically $[0 \; -1 \; 0]^T$) can be represented as $$\begin{bmatrix} \Delta\dot\omega \\ \Delta\dot h \end{bmatrix} = T \begin{bmatrix} \Delta\omega \\ \Delta h \end{bmatrix} + \begin{bmatrix} -I^{-1}e_w \\ 1 \end{bmatrix} \tau$$

wherein $$T = \begin{bmatrix} -I^{-1}[\omega_0^x I - (I\omega_0 + h_0)^x] & -I^{-1}\omega_0^x e_\omega \\ 0 & 0 \end{bmatrix};$$

$$\omega = \begin{bmatrix} \omega_x \\ \omega_y \\ \omega_z \end{bmatrix}$$

is a vector describing a rotational rate of the spacecraft about axes x, y, and z respectively;

$$h = \begin{bmatrix} h_x \\ h_y \\ h_z \end{bmatrix}$$

is a vector describing the rotational momentum of the spacecraft about axes x, y, and z respectively;

$$I = \begin{bmatrix} I_{11} & I_{12} & I_{13} \\ I_{21} & I_{22} & I_{23} \\ I_{31} & I_{32} & I_{33} \end{bmatrix}$$

is a matrix describing the moment of inertia of the spacecraft and (diagonal components, $I_{11}$ $I_{22}$ $I_{33}$, of the I matrix are the principal inertia components; the off-diagonal components are the cross product of inertia of the rigid body);

$$\omega_0 = \begin{bmatrix} 0 \\ 0 \\ \omega_s \end{bmatrix},$$

wherein $\omega_s$ is the spin rate of the spacecraft about the z axis;

$$h_0 = \begin{bmatrix} -I_{13}\omega_s \\ -I_{23}\omega_s \\ 0 \end{bmatrix};$$

$\tau$ is a torque applied to the spacecraft 100 by the wheel; and wherein the operator x is defined such that follows:

The cross-product of vectors $\vec{a}$ and $\vec{b}$ (i.e. $\vec{a} \times \vec{b}$) is $$\begin{bmatrix} \vec{i} & \vec{j} & \vec{k} \\ a_1 & a_2 & a_3 \\ b_1 & b_2 & b_3 \end{bmatrix} = \begin{bmatrix} a_2 b_3 - a_3 b_2 \\ a_3 b_1 - a_1 b_3 \\ a_1 b_2 - a_2 b_1 \end{bmatrix}$$

$$= \begin{bmatrix} 0 & -a_3 & a_2 \\ a_3 & 0 & -a_1 \\ -a_2 & a_1 & 0 \end{bmatrix} \begin{bmatrix} b_1 \\ b_2 \\ b_3 \end{bmatrix} a^x b. \text{ Therefore,}$$

$$a^x = \begin{bmatrix} 0 & -a_3 & a_2 \\ a_3 & 0 & -a_1 \\ -a_2 & a_1 & 0 \end{bmatrix}, \text{ and } \omega^x = \begin{bmatrix} 0 & -\omega_3 & \omega_2 \\ \omega_3 & 0 & -\omega_1 \\ -\omega_2 & \omega_1 & 0 \end{bmatrix}.$$

Since they are not stabilizable, states $\omega_z$ and $H_z$ are eliminated from the above dynamics, resulting in a 4-state, two-input, two-output plant dynamic description with only $\omega_x$ and $\omega_y$ fed back.

To design a robust control system, anticipated plant variations and other uncertainties must be bounded. Such anticipated plant variations include rigid body plant mass property variations (as fuel is expended, for example), and fuel slosh.

Returning to FIG. 4, in block 404, the system dynamics that are unmodeled by the plant model $G_0$ 302 are bounded by a weighting function W.

Figure 6:
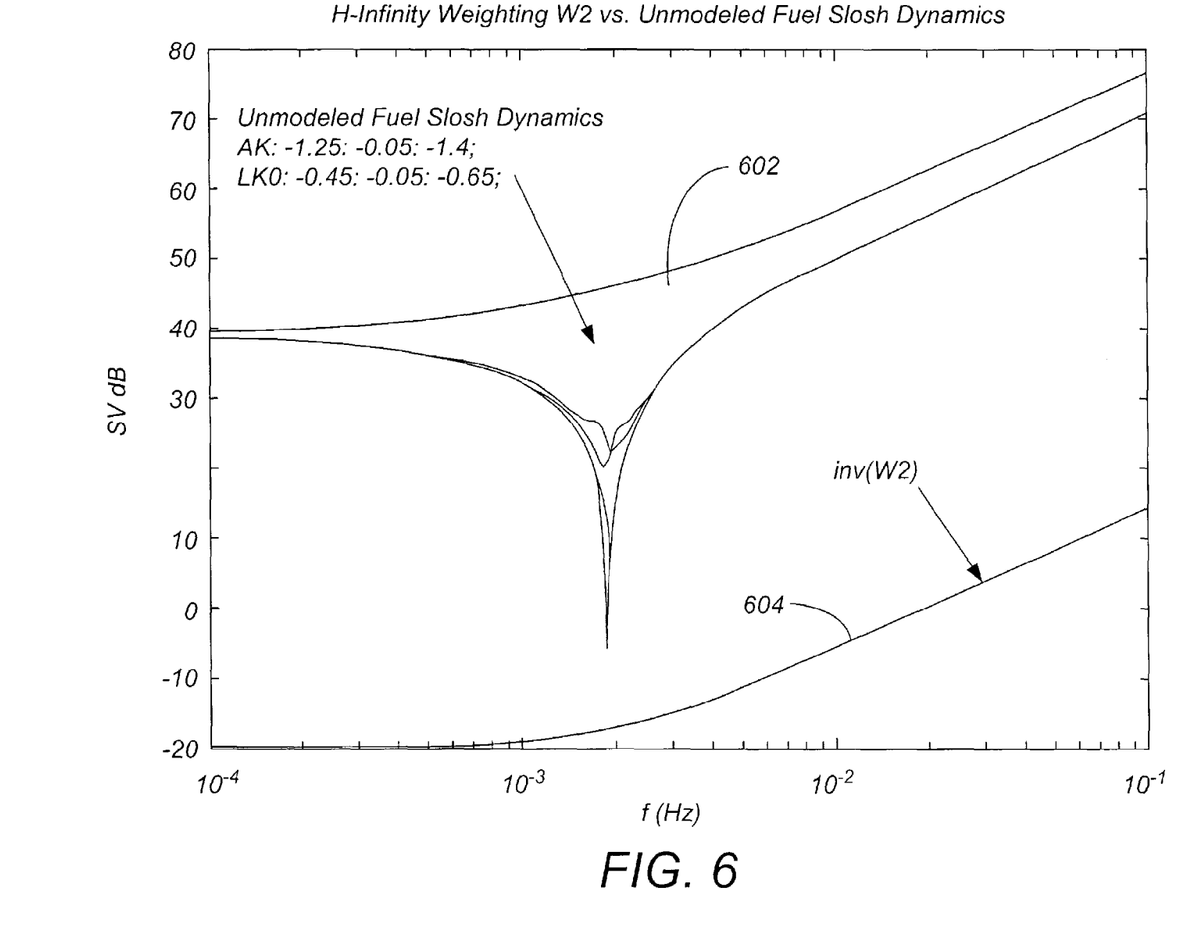
FIG. 6 is a diagram showing an example of how unmodeled system dynamics can be bounded by a weighting function W.

FIG. 6 is a diagram showing an example of how unmodeled system dynamics can be bounded by a weighting function W. In this specific example, a Bode plot 602 of the unmodeled fuel slosh dynamics for varying parameters $A_k$ and $LK_0$, where $A_k$ is the modal inertia coupling coefficient and $LK_0$ is the modal frequency parameter. Both parameters define a particular two-dimensional Finite Element Model (FEM) of the fuel sloshing dynamics. Weighting function 604 is defined to bound the unmodeled system dynamics 602. Note that the higher the bandwidth of the weighting function W (FIG. 6 illustrates $W^1$), the more fuel slosh uncertainty in the system can be tolerated.

Returning to FIG. 4, an augmented plant model T is determined from the weighting function W and the system model G, as shown in block 406.

Figure 7:
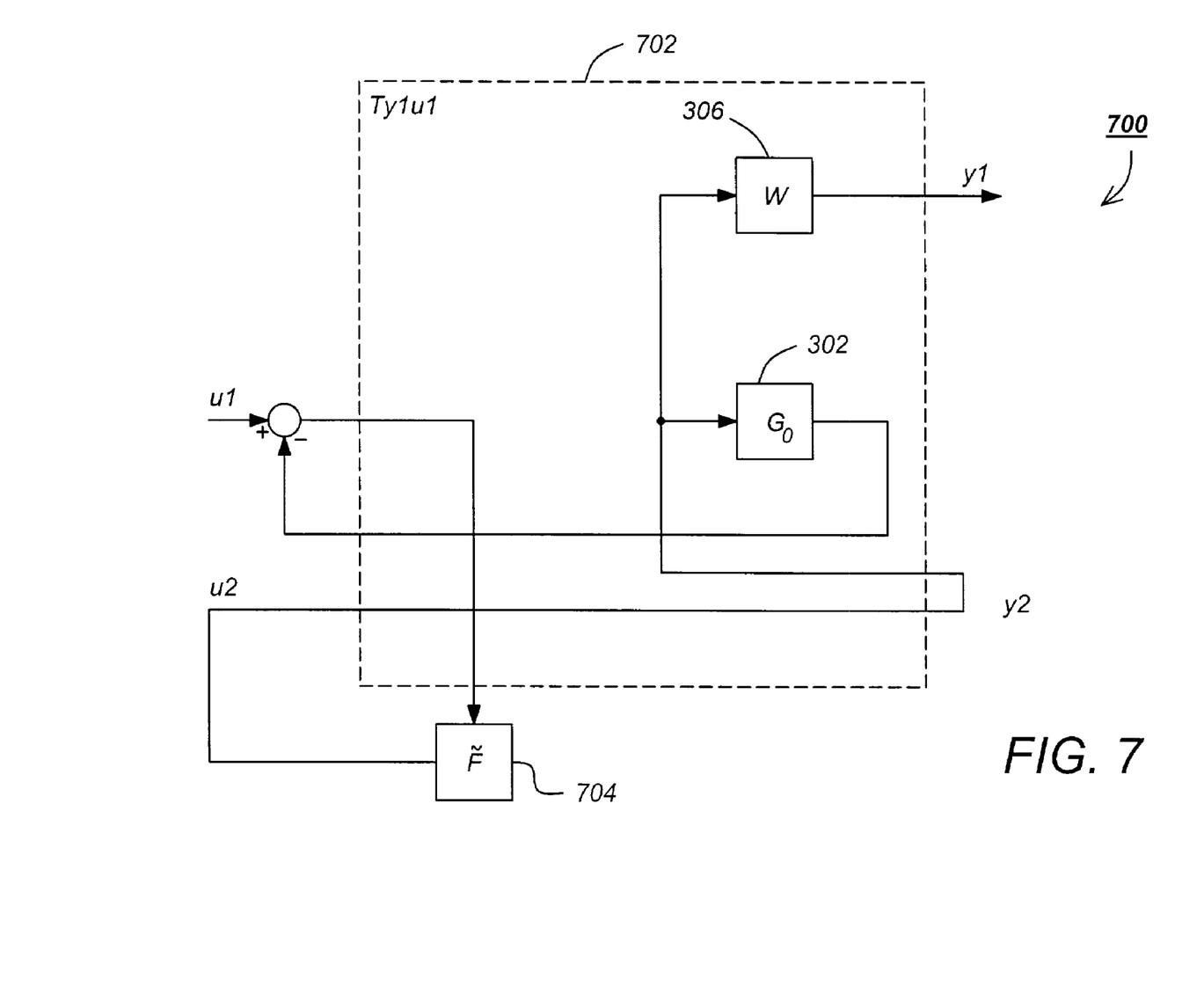
FIG. 7 is a diagram an augmented plant model.

FIG. 7 is a diagram showing an augmented plant model 700. In this configuration, the plant model T 702 defined the response of the output y1 to an input u1, and includes system model G 302, the bounding function W 306, and the controller $\tilde{F}$ (704).

Returning again to FIG. 4, a transform is applied to the augmented plant model T 700, as shown in block 408. In one embodiment, the transform is a bilinear transform such as the transform $$s = \frac{\tilde{s} + p_1}{1 + \frac{\tilde{s}}{p_2}}$$

wherein s is a Laplace operator $s=j\omega$, $p_1$ is a first pole, $p_2$ is a second pole, and $\tilde{s}$ is the Laplace operator s in the transformed ($H^\infty$) domain. The first pole $p_1$ at least partially characterizes the bandwidth of the closed loop system 300 that results from the application of the design methodology of the present invention, while the second pole $p_2$ at least partially characterizes the damping of the closed loop system 300. Accordingly, the poles $p_1$ and $p_2$ are selected to result in the desired bandwidth and damping of the closed loop system.

Figure 8:
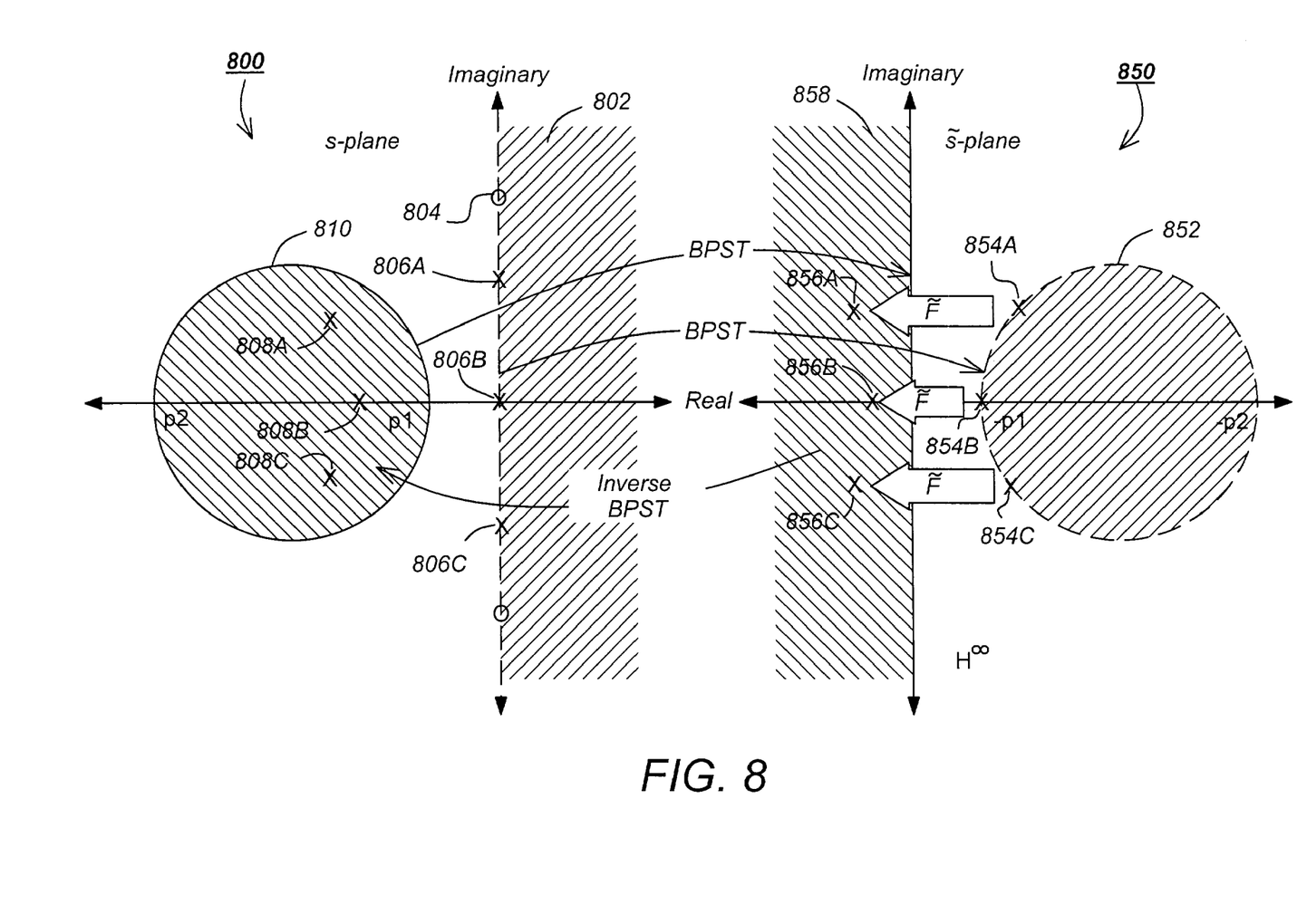
FIG. 8 is a diagram showing the operation of a bilinear pole-shifting transform.

FIG. 8 is a diagram showing the operation of the bilinear pole-shifting transform from a first plane (s-plane) 800 to a second ($\tilde{s}$-plane) 850. The first plane 800 is defined by a real and imaginary axis, upon which the poles and zeros of the closed loop system model are plotted. Poles 806 (denoted by Xs in FIG. 8) and zeros 804 (denoted by "0"s) appear on the imaginary axis. Poles 806 appearing in the right half plane (RHP) 802 indicate an unstable closed loop system, whereas poles appearing in the left half plane indicate a stable closed loop system.

When the bilinear transform is applied to the augmented plant model T 702, the right half plane 802 gets mapped into a region 852. In the illustrated example, wherein the bilinear transform is defined in terms of poles $p_1$ and $p_2$, the region 852 is a circle that intersects the real axis at $-p_1$ and $-p_2$, as shown. With this transform, poles 806A-806C are mapped to locations 854A-854C on the periphery of the circle 852.

Returning to FIG. 4, a controller $F(\tilde{s})$ 704 (hereinafter alternatively designated as $\tilde{F}$) can be designed from the transformed augmented plant model 700. In doing so, the uncertainty model is folded into the controller $\tilde{F}$ 704 design.

Figure 9:
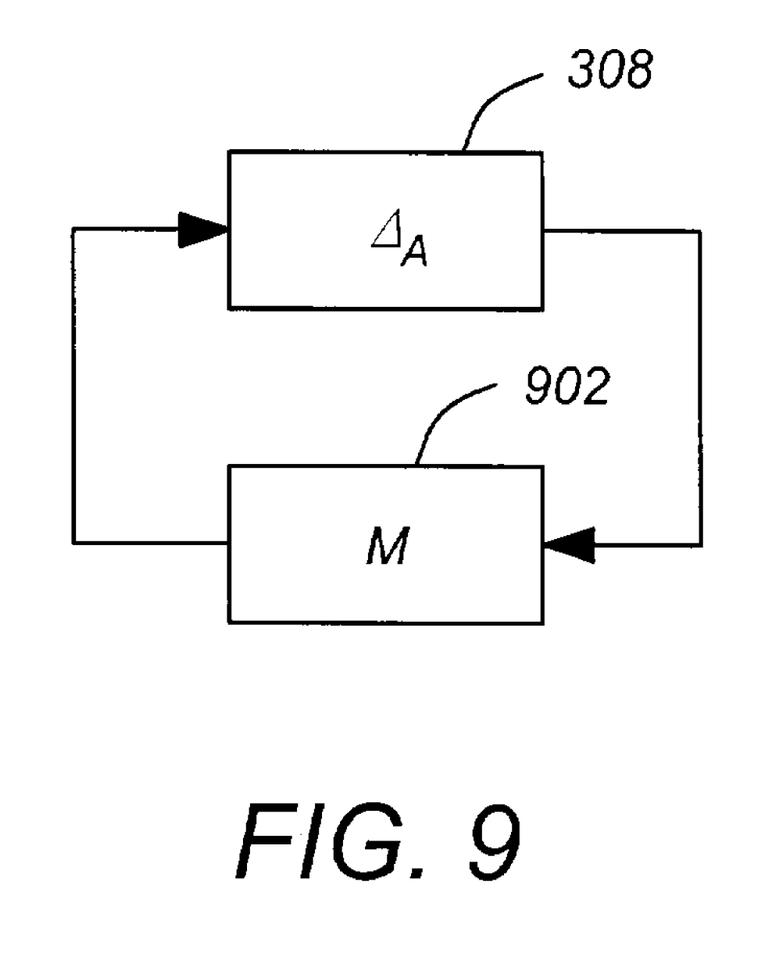
FIG. 9 is a diagram of a modified representation of the system model.

FIG. 9 is a modified representation of the system model 300. Here, the system model 300 can also be represented by its closed loop equivalent $$M = W * \tilde{F} * (I + G\tilde{F})^{-1}$$

By the small gain theorem, if $|\Delta_A|*|M|<1$, the closed loop is stable. In the foregoing case, W 306 bounds the unmodeled fuel slosh dynamics by an additive uncertainty. W 306 is also a weighting function in the $H^\infty$ domain on the plant G 302 to be optimized. Hence, controller $\tilde{F}$ 704 in the $H^\infty$ domain can be found that bounds the pre-specified and unmodeled fuel slosh dynamics 308.

This can be accomplished by minimizing the measure of maximum singular value ($\bar{\sigma}$) of the augmented plant transfer function $[W\tilde{F}(I+G\tilde{F})^{-1}]$ to be less than one (Small Gain Stability Theorem). If the transformed augmented plant model T 700 can be expressed in the following state space realization:

$$T_{\frac{y1}{u1}} = \begin{bmatrix} A & B_1 & B_2 \\ \hline C_1 & D_{11} & D_{12} \\ C_2 & D_{21} & D_{22} \end{bmatrix}$$

the controller $\tilde{F}$ can be parameterized into two game theoretic Riccati equations:

$$\tilde{F} = \begin{bmatrix} A + B_1 B_1^T P + B_2 R + ZLC_2 & -ZL \\ \hline R & 0 \end{bmatrix}$$

where $R=-B_2^T P$, $L=-QC_2^T$, and $Z=(I-PQ)^{-1}$, and wherein $$P = Ric \begin{bmatrix} A & B_1 B_1^T - B_2 B_2^T \\ -C_1^T & -A^T \end{bmatrix} \text{ and}$$

$$Q = Ric \begin{bmatrix} A^T & C_1^T C_1 - C_2^T C_2 \\ -B_1 B_1^T & -A \end{bmatrix}$$

The result of the foregoing is a controller, $\tilde{F}$ 704 which propagates the closed loop poles from the edge of region 852 to the right half plane (RHP) 858 of the $\tilde{s}$-plane to locations 856A-856C.

Returning to FIG. 4, an inverse of the applied transform is then applied to the controller $\tilde{F}$ defined above to produce controller F 304. This is shown in block 412. Continuing the exemplary embodiment discussed above, the inverse transform is defined as $$\tilde{s} = \frac{-s + p_1}{\frac{s}{p_2 - 1}}$$

Referring again to FIG. 8, application of the inverse transform maps the left half plane 858 of the $\tilde{s}$-plane 850 to the region 810 of the s-plane 800. Accordingly, the inverse transform moves the poles 856A-856C from their locations in the LHP 858 of the $\tilde{s}$-plane 850 to locations 808A-808C within the region 810 of the s-plane 800. Since the mapping compresses the LHP 858 into a smaller region 810 closer to the real axis and further away from the imaginary axis of the s-plane, the stability of the resulting system is enhanced.

Therefore, with respect to the example of the stabilization of the spinning spacecraft 100, it can be seen that the application of the bilinear transform maps the nutation poles onto the circle with end points $-p_1$ and $-p_2$ in the RHP 802. The plant dynamics have become more "unstable" in the new domain. However, as shown above, the direct Ricatti solution maps the open-loop unstable poles in FIG. 8 to their mirror image in plane 800 on a circle 810 with endpoints $p_1$ and $p_2$ as their final closed loop poles. The controller $\tilde{F}$ maps the $\tilde{s}$ plane 850 closed loop poles further to the left when transformed back to the s plane 800.

This design synthesis technique not only stabilizes the spinning dynamics, but also de-couples the roll/pitch axis automatically while minimizing the sensitivity function of the system. Fuel slosh dynamics, which have highly uncertain behavior, are treated as unmodeled dynamics, and a weighting function W (which is folded into the design process) is imposed on the overall cost function, thus bounding the fuel slosh dynamic uncertainty. The resulting controller F is therefore stable against all fuel slosh uncertainty bounded by the weighting function W.

Conclusion

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of designing a robust controller for a dynamic system, comprising the steps of;

determining a plant model G of the system dynamics;

bounding system dynamics unmodeled by the plant model G of the system dynamics by a weighting function W;

applying a transform to an augmented plant model T having the plant model G and the weighting function W;

defining a controller $\tilde{F}$ from the transformed plant model T;

applying an inverse of the transform to the controller $\tilde{F}$ defined from the transformed plant model and the weighting function W to generate the robust controller F; and storing the robust controller F in a computer-readable medium.

2. The method of claim 1, wherein the plant model G is a linearized plant model, and the system dynamics unmodeled by the plant model G are non-linear system dynamics.

3. The method of claim 1, wherein the transform comprises a bilinear transform.

4. The method of claim 3, wherein the bilinear transform comprises a pole-shifting transform transforming the plant model T from a first frequency domain s to a second frequency domain $\tilde{s}$.

5. The method of claim 4, wherein the bilinear transform comprises $$s = \frac{\tilde{s} + p_1}{1 + \frac{\tilde{s}}{p_2}},$$

and the inverse of the bilinear transform is $$\tilde{s} = \frac{-s + p_1}{\frac{s}{p_2 - 1}},$$

wherein $p_1$ is a first pole at least partially characterizing a bandwidth of a closed loop system having the controller and the dynamic system, and $p_2$ is a second pole at least partially characterizing a damping of the closed loop system.

6. The method of claim 5, wherein the controller $\tilde{F}$ is determined by minimizing the measure of maximum singular value ($\bar{\sigma}$) of the augmented plant transfer function [W $\tilde{F}(I+G\tilde{F})^{-1}$] to be less than one.

7. The method of claim 5, wherein the controller is characterizable by $$\tilde{F} = \begin{bmatrix} A + B_1 B_1^T P + B_2 R + ZLC_2 & -ZL \\ R & 0 \end{bmatrix}$$

wherein $R = -B_2^T P$, $L = -QC_2^T$, and $Z = (I-PQ)^{-1}$, and wherein $A, B_1, B_2, C_1, C_2, D_{11}, D_{12}, D_{21},$ and $D_{22}$ are parameters in a plant model $$T = \begin{bmatrix} A & B_1 & B_2 \\ C_1 & D_{11} & D_{12} \\ C_2 & D_{21} & D_{22} \end{bmatrix},$$

and wherein $$P = Ric \begin{bmatrix} A & B_1 B_1^T - B_2 B_2^T \\ -C_1^T & -A^T \end{bmatrix}$$

and $$Q = Ric \begin{bmatrix} A^T & C_1^T C_1 - C_2^T C_2 \\ -B_1 B_1^T & -A \end{bmatrix}$$

are solutions of a Game-Theretic Riccati equation.

8. The method of claim 1, wherein the plant model G is a linearized dynamic model.

9. The method of claim 1, wherein:
the dynamic system is a spacecraft having a momentum wheel having a momentum $h_0$, and the dynamic model G is defined according to the relation $$\begin{bmatrix} \Delta \dot{\omega} \\ \Delta \dot{h} \end{bmatrix} = T \begin{bmatrix} \Delta \omega \\ \Delta h \end{bmatrix} + \begin{bmatrix} -I^{-1} e_w \\ 1 \end{bmatrix} \tau;$$

wherein $$T = \begin{bmatrix} -I^{-1}[\omega_0^x I - (I\omega_0 + h_0)^x] & -I^{-1} \omega_0^x e_w \\ 0 & 0 \end{bmatrix};$$

wherein $$\omega = \begin{bmatrix} \omega_x \\ \omega_y \\ \omega_z \end{bmatrix}$$

is a vector describing a rotational rate of the spacecraft about an x, y, and z axis, respectively and $$h = \begin{bmatrix} h_x \\ h_y \\ h_z \end{bmatrix}$$

is a vector describing the rotational momentum of the spacecraft about the x, y, and z axis, respectively;

$$I = \begin{bmatrix} I_{11} & I_{12} & I_{13} \\ I_{21} & I_{22} & I_{23} \\ I_{31} & I_{32} & I_{33} \end{bmatrix}$$

is a matrix describing the moment of inertia of the spacecraft, the matrix having diagonal components, $I_{11}$ $I_{22}$ $I_{33}$ which are principal inertia components, and off-diagonal components $I_{21}$ $I_{32}$ $I_{31}$ and $I_{12}$ $I_{23}$ $I_{13}$ are the cross product of inertia components;

$$\omega_0 = \begin{bmatrix} 0 \\ 0 \\ \omega_s \end{bmatrix},$$

wherein $\omega_s$ is the spin rate of the spacecraft about the z axis, and $$h_0 = \begin{bmatrix} -I_{13} \omega_s \\ -I_{23} \omega_s \\ 0 \end{bmatrix};$$

$e_w$ is a unit vector axis of a momentum wheel, and $\tau$ is a torque applied to the spacecraft by the momentum wheel; and and wherein the operator x is defined such that $\vec{a} \times \vec{b} = a^x b$.

10. An apparatus for designing a robust controller for a dynamic system, comprising:
means for determining a plant model G of the system dynamics;
means for bounding system dynamics unmodeled by the plant model G of the system dynamics by a weighting function W;
means for applying a transform to an augmented plant model T having the plant model G and the weighting function W;
means for defining a controller $\tilde{F}$ from the transformed plant model T;
means for applying an inverse of the transform to the controller $\tilde{F}$ defined from the transformed plant model and the weighting function W to generate the robust controller F; and
means for storing the robust controller in a computer-readable medium.

11. The apparatus of claim 10, wherein the plant model G is a linearized plant model, and the system dynamics unmodeled by the plant model G are non-linear system dynamics.

12. The apparatus of claim 10, wherein the transform comprises a bilinear transform.

13. The apparatus of claim 12, wherein the bilinear transform comprises a pole-shifting transform transforming the plant model T from a first frequency domain s to a second frequency domain $\tilde{s}$.

14. The apparatus of claim 13, wherein the bilinear transform comprises $$s = \frac{\tilde{s} + p_1}{1 + \frac{\tilde{s}}{p_2}},$$

and the inverse of the bilinear transform is $$\tilde{s} = \frac{-s + p_1}{\frac{s}{p_2 - 1}},$$

wherein $p_1$ is a first pole at least partially characterizing a bandwidth of a closed loop system having the controller and the dynamic system, and $p_2$ is a second pole at least partially characterizing a damping of the closed loop system.

15. The apparatus of claim 14, wherein the controller is determined by minimizing the measure of maximum singular value ($\bar{\sigma}$) of the augmented plant transfer function [W $\tilde{F}(I+G\tilde{F})^{-1}$] to be less than one.

16. The apparatus of claim 14, wherein the controller is characterizable by $$\tilde{F} = \begin{bmatrix} A + B_1 B_1^T P + B_2 R + ZLC_2 & -ZL \\ R & 0 \end{bmatrix}$$

wherein $R=-B_2^T P$, $L=-QC_2^T$, and $Z=(I-PQ)^{-1}$, and wherein A, $B_1$, $B_2$, $C_1$, $C_2$, $D_{11}$, $D_{12}$, $D_{21}$, and $D_{22}$ are parameters in a plant model $$T = \begin{bmatrix} A & B_1 & B_2 \\ C_1 & D_{11} & D_{12} \\ C_2 & D_{21} & D_{22} \end{bmatrix},$$

and wherein $$P = Ric \begin{bmatrix} A & B_1 B_1^T - B_2 B_2^T \\ -C_1^T & -A^T \end{bmatrix}$$

and $$Q = Ric \begin{bmatrix} A^T & C_1^T C_1 - C_2^T C_2 \\ -B_1 B_1^T & -A \end{bmatrix}$$

are solutions of a Game-Theretic Riccati equation.

17. The apparatus of claim 10, wherein the plant model G is a linearized dynamic model.

18. The apparatus of claim 10, wherein:
the dynamic system is a spacecraft having a momentum wheel having a momentum $h_0$, and the dynamic model G is defined according to the relation $$\begin{bmatrix} \Delta \dot{\omega} \\ \Delta \dot{h} \end{bmatrix} = T \begin{bmatrix} \Delta \omega \\ \Delta h \end{bmatrix} + \begin{bmatrix} -I^{-1} e_w \\ 1 \end{bmatrix} \tau;$$

wherein $$T = \begin{bmatrix} -I^{-1}[\omega_0^x I - (I\omega_0 + h_0)^x] & -I^{-1}\omega_0^x e_\omega \\ 0 & 0 \end{bmatrix};$$

wherein $$\omega = \begin{bmatrix} \omega_x \\ \omega_y \\ \omega_z \end{bmatrix}$$

is a vector describing a rotational rate of the spacecraft about an x, y, and z axis, respectively and $$h = \begin{bmatrix} h_x \\ h_y \\ h_z \end{bmatrix}$$

is a vector describing the rotational momentum of the spacecraft about the x, y, and z axis, respectively;

$$I = \begin{bmatrix} I_{11} & I_{12} & I_{13} \\ I_{21} & I_{22} & I_{23} \\ I_{31} & I_{32} & I_{33} \end{bmatrix}$$

is a matrix describing the moment of inertia of the spacecraft, the matrix having diagonal components, $I_{11}$ $I_{22}$ $I_{33}$ which are principal inertia components, and off-diagonal components $I_{21}$ $I_{32}$ $I_{31}$ and $I_{12}$ $I_{23}$ $I_{13}$ are the cross product of inertia components;

$$\omega_0 = \begin{bmatrix} 0 \\ 0 \\ \omega_s \end{bmatrix},$$

wherein $\omega_s$ is the spin rate of the spacecraft about the z axis, and $$h_0 = \begin{bmatrix} -I_{13}\omega_s \\ -I_{23}\omega_s \\ 0 \end{bmatrix};$$

$e_w$ is a unit vector axis of a momentum wheel, and $\tau$ is a torque applied to the spacecraft by the momentum wheel; and and wherein the operator x is defined such that $\vec{a} \times \vec{b} = a^x b$.

19. A program storage device, readable by a computer, tangibly embodying at least one program of instructions executable by the computer to perform method steps of designing a robust controller for a dynamic system, the method steps comprising the steps of:

determining a plant model G of the system dynamics;

bounding system dynamics unmodeled by the plant model G of the system dynamics by a weighting function W;

applying a transform to an augmented plant model T having the plant model G and the weighting function W;

defining a controller $\tilde{F}$ from the transformed plant model T; and applying an inverse of the transform to the controller $\tilde{F}$ defined from the transformed plant model and the weighting function W to generate the robust controller F.

20. The program storage device of claim 19, wherein the plant model G is a linearized plant model, and the system dynamics unmodeled by the plant model G are non-linear system dynamics.

21. The program storage device of claim 19, wherein the transform comprises a bilinear transform.

22. The program storage device of claim 21, wherein the bilinear transform comprises a pole-shifting transform transforming the plant model T from a first frequency domain s to a second frequency domain $\tilde{s}$.

23. The program storage device of claim 22, wherein the bilinear transform comprises $$s = \frac{\tilde{s} + p_1}{1 + \frac{\tilde{s}}{p_2}},$$

and the inverse of the bilinear transform is $$\tilde{s} = \frac{-s + p_1}{\frac{s}{p_2} - 1},$$

wherein $p_1$ is a first pole at least partially characterizing a bandwidth of a closed loop system having the controller and the dynamic system, and $p_2$ is a second pole at least partially characterizing a damping of the closed loop system.

24. The program storage device of claim 23, wherein the controller is determined by minimizing the measure of maximum singular value ($\bar{\sigma}$) of the augmented plant transfer function $[W\tilde{F}(I+G\tilde{F})^{-1}]$ to be less than one.

25. The program storage device of claim 23, wherein the controller is characterizable by $$\tilde{F} = \begin{bmatrix} A + B_1 B_1^T P + B_2 R + ZLC_2 & -ZL \\ R & 0 \end{bmatrix}$$

wherein $R=-B_2^T P$, $L=-QC_2^T$, and $Z=(I=PQ)^{-1}$, and wherein $A$, $B_1$, $B_2$, $C_1$, $C_2$, $D_{11}$, $D_{12}$, $D_{21}$, and $D_{22}$ are parameters in a plant model $$T = \begin{bmatrix} A & B_1 & B_2 \\ C_1 & D_{11} & D_{12} \\ C_2 & D_{21} & D_{22} \end{bmatrix},$$

and wherein $$P = Ric \begin{bmatrix} A & B_1 B_1^T - B_2 B_2^T \\ -C_1^T & -A^T \end{bmatrix}$$

and $$Q = Ric \begin{bmatrix} A^T & C_1^T C_1 - C_2^T C_2 \\ -B_1 B_1^T & -A \end{bmatrix}$$

are solutions of a Game-Theretic Riccati equation.

26. The program storage device of claim 19, wherein the plant model G is a linearized dynamic model.

27. The program storage device of claim 19, wherein:

the dynamic system is a spacecraft having a momentum wheel having a momentum $h_0$, and the dynamic model G is defined according to the relation $$\begin{bmatrix} \Delta\dot{\omega} \\ \Delta\dot{h} \end{bmatrix} = T \begin{bmatrix} \Delta\omega \\ \Delta h \end{bmatrix} + \begin{bmatrix} -I^{-1} e_w \\ 1 \end{bmatrix} \tau;$$

wherein $$T = \begin{bmatrix} -I^{-1}[\omega_0^x I - (I\omega_0 + h_0)^x] & -I^{-1}\omega_0^x e_\omega \\ 0 & 0 \end{bmatrix};$$

wherein $$\omega = \begin{bmatrix} \omega_x \\ \omega_y \\ \omega_z \end{bmatrix}$$

is a vector describing a rotational rate of the spacecraft about an x, y, and z axis, respectively and $$h = \begin{bmatrix} h_x \\ h_y \\ h_z \end{bmatrix}$$

is a vector describing the rotational momentum of the spacecraft about the x, y, and z axis, respectively;

$$I = \begin{bmatrix} I_{11} & I_{12} & I_{13} \\ I_{21} & I_{22} & I_{23} \\ I_{31} & I_{32} & I_{33} \end{bmatrix}$$

is a matrix describing the moment of inertia of the spacecraft, the matrix having diagonal components, $I_{11}$ $I_{22}$ $I_{33}$ which are principal inertia components, and off-diagonal components $I_{21}$ $I_{32}$ $I_{31}$ and $I_{12}$ $I_{23}$ $I_{13}$ are the cross product of inertia components;

$$\omega_0 = \begin{bmatrix} 0 \\ 0 \\ \omega_s \end{bmatrix},$$

wherein $\omega_s$ is the spin rate of the spacecraft about the z axis, and $$h_0 = \begin{bmatrix} -I_{13}\omega_s \\ -I_{23}\omega_s \\ 0 \end{bmatrix};$$

$e_w$ is a unit vector axis of a momentum wheel, and $\tau$ is a torque applied to the spacecraft by the momentum wheel; and and wherein the operator x is defined such that $\vec{a} \times \vec{b} = a^x b$.

28. A method of controlling a dynamic system, comprising the steps of:
  determining a plant model G of the system dynamics of the dynamic system;
  bounding system dynamics unmodeled by the plant model G of the system dynamics by a weighting function W;
  applying a transform to an augmented plant model T having the plant model G and the weighting function W;
  defining a controller $\tilde{F}$ from the transformed plant model T;
  applying an inverse of the transform to the controller $\tilde{F}$ defined from the transformed plant model and the weighting function W to generate the a robust controller F; and controlling the dynamic system with the generated robust controller F.

29. The method of claim 28, wherein the plant model G is a linearized plant model, and the system dynamics unmodeled by the plant model G are non-linear system dynamics.

30. The method of claim 28, wherein the transform comprises a bilinear transform.

31. The method of claim 30, wherein the bilinear transform comprises a pole-shifting transform transforming the plant model T from a first frequency domain s to a second frequency domain $\tilde{s}$.

32. The method of claim 31, wherein the bilinear transform comprises $$s = \frac{\tilde{s} + p_1}{1 + \frac{\tilde{s}}{p_2}},$$

and the inverse of the bilinear transform is $$\tilde{s} = \frac{-s + p_1}{\frac{s}{p_2 - 1}},$$

wherein $p_1$ is a first pole at least partially characterizing a bandwidth of a closed loop system having the controller and the dynamic system, and $p_2$ is a second pole at least partially characterizing a damping of the closed loop system.

33. The method of claim 32, wherein the controller $\tilde{F}$ is determined by minimizing the measure of maximum singular value ($\bar{\sigma}$) of the augmented plant transfer function [W $\tilde{F}(I+G\tilde{F})^{-t}$] to be less than one.

34. The method of claim 32, wherein the controller is characterizable by $$\tilde{F} = \begin{bmatrix} A + B_1 B_1^T P + B_2 R + ZLC_2 & -ZL \\ R & 0 \end{bmatrix}$$

wherein $R=-B_2^T P$, $L=-QC_2^T$, and $Z=(I-PQ)^{-1}$, and wherein A, $B_1$, $B_2$, $C_1$, $C_2$, $D_{11}$, $D_{12}$, $D_{21}$, and $D_{22}$ are parameters in a plant model $$T = \begin{bmatrix} A & B_1 & B_2 \\ C_1 & D_{11} & D_{12} \\ C_2 & D_{21} & D_{22} \end{bmatrix},$$

and wherein $$P = Ric \begin{bmatrix} A & B_1 B_1^T - B_2 B_2^T \\ -C_1^T & -A^T \end{bmatrix}$$

and $$Q = Ric \begin{bmatrix} A^T & C_1^T C_1 - C_2^T C_2 \\ -B_1 B_1^T & -A \end{bmatrix}$$

are solutions of a Game-Theretic Riccati equation.

35. The method of claim 28, wherein the plant model G is a linearized dynamic model.

36. The method of claim 28, wherein:
  the dynamic system is a spacecraft having a momentum wheel having a momentum $h_0$, and the dynamic model G is defined according to the relation $$\begin{bmatrix} \Delta\dot{\omega} \\ \Delta\dot{h} \end{bmatrix} = T \begin{bmatrix} \Delta\omega \\ \Delta h \end{bmatrix} + \begin{bmatrix} -I^{-1} e_w \\ 1 \end{bmatrix} \tau;$$

wherein $$T = \begin{bmatrix} -I^{-1}[\omega_0^x I - (I\omega_0 + h_0)^x] & -I^{-1} \omega_0^x e_\omega \\ 0 & 0 \end{bmatrix};$$

wherein $$\omega = \begin{bmatrix} \omega_x \\ \omega_y \\ \omega_z \end{bmatrix}$$

is a vector describing a rotational rate of the spacecraft about an x, y, and z axis, respectively and $$h = \begin{bmatrix} h_x \\ h_y \\ h_z \end{bmatrix}$$

is a vector describing the rotational momentum of the spacecraft about the x, y, and z axis, respectively;

$$I = \begin{bmatrix} I_{11} & I_{12} & I_{13} \\ I_{21} & I_{22} & I_{23} \\ I_{31} & I_{32} & I_{33} \end{bmatrix}$$

is a matrix describing the moment of inertia of the spacecraft, the matrix having diagonal components, $I_{11}$ $I_{22}$ $I_{33}$ which are principal inertia components, and off-diagonal components $I_{21}$ $I_{32}$ $I_{31}$ and $I_{12}$ $I_{23}$ $I_{13}$ are the cross product of inertia components;

$$\omega_0 = \begin{bmatrix} 0 \\ 0 \\ \omega_s \end{bmatrix},$$

wherein $\omega_s$ is the spin rate of the spacecraft about the z axis, and $$h_0 = \begin{bmatrix} -I_{13}\omega_s \\ -I_{23}\omega_s \\ 0 \end{bmatrix};$$

$e_w$ is a unit vector axis of a momentum wheel, and $\tau$ is a torque applied to the spacecraft by the momentum wheel; and and wherein the operator x is defined such that $\vec{a} \times \vec{b} = a^x b$.

* * * * *